Patented June 15, 1948

2,443,493

UNITED STATES PATENT OFFICE 2,443,493

CHLORINATION OF FURAN

Oliver W. Cass and Harry B. Copelin, Niagara Falls, N. Y., assignors to E. I. du Pont de Nemours & Company, Wilmington, Del., a corporation of Delaware No Drawing. Application May 12, 1945, Serial No. 593,532

6 Claims. (Cl. 260—345)

1

The object of this invention is the preparation of 2-chlorofuran by a new and improved procedure. A still further object of this invention is to prepare this compound by a chlorination procedure which is commercially feasible due to its simplicity and ease of operation. Still further objects will be hereinafter apparent.

It has hitherto before been thought impossible to directly chlorinate furan because of the extreme sensitivity of furan to the presence of small quantities of hydrogen chloride. These traces of hydrogen chloride caused extremely vigorous, exothermic polymerization of furan resulting in the formation of large amounts of black polymeric material. 2-Chlorofuran has previously been prepared by the decomposition of the corresponding chlorinated furoic acid, a process which is economically unattractive. (J. A. C. S. 52:2083.)

We have now found that by careful observation of certain reaction conditions it is possible to chlorinate furan directly to produce 2-chlorofuran in good yield. The tendency of furan to polymerize when in contact with the hydrogen chloride which is secured as a by-product from the above chlorination is avoided by operating under conditions resulting in the almost instantaneous removal of substantially all of the hydrogen chloride from the reaction system. When the polymerization of furan is thus prevented, a smooth chlorination of furan to the chlorofuran becomes possible. The invention is illustrated by the following example:

Example

Furan is charged into a reaction vessel which is fitted with a fractionation column containing a lower short packed section. At the top of the packed section of this column an inlet tube for chlorine is provided. At the top of the fractionation column a condenser and receiver is provided. From the receiver the liquid condensate returns through a liquid seal into the reaction vessel. Uncondensed material, primarily hydrogen chloride, is removed from the receiver as vapor and is absorbed in any of the customary absorption systems for hydrogen chloride. Heat is applied to the reaction vessel beneath the fractionation column, and a good circulation of furan is set up through the packed section of the column, through the unpacked section of the column, through the condenser and receiver, and back into the reaction vessel. Chlorine is then admitted to the vapors of furan. Very rapid reaction results so that no chlorine is present by the time the furan vapors reach the top of the column. As the monochlorofuran which is formed boils at a considerably higher temperature than the furan, a portion of the monochloride will drop back into the packed section of the column and return to the reaction vessel. The unchlorinated furan together with a portion of the monochloride and the by-product, hydrogen chloride, will pass into the condenser and receiver. The hydrogen chloride then will be separated in the receiver and passed to the absorption system while the furan together with the monochloride will be returned to the reaction vessel. In this fashion a high concentration of hydrogen chloride in the reaction vessel where the temperature is high is avoided, and excessive polymerization of the furan is prevented. As additional amounts of chlorine are added to the reaction system, the boiling point of the contents of the reaction vessel will increase until it approaches monochlorofuran. At this point chlorination is halted, and the contents of the reactor discharged into a still where separation of the unchlorinated furan from the monochloride is secured. Operating in this fashion, the formation of the higher chlorides of furan is substantially avoided, and high yields of 2-chlorofuran are secured. The 2-chlorofuran thus obtained, after purification by distillation, is a colorless liquid boiling at 77° C. and has a density of 1.189 at 25° C.

The invention is not restricted to the specific method of the above example. Other modifications will be apparent to the skilled chemist, whereby a relatively small amount of chlorine is fed into furan vapor, the resulting 2-chlorofuran is condensed out, and the remaining mixture of furan vapor and hydrogen chloride is condensed to liquefy the furan and thus liberate the gaseous HCl. The condensed 2-chlorofuran may be separately collected, if desired, or it may be mixed with the condensed furan, as in the above example.

If desired, the reaction temperature may be maintained above the boiling point of the product, 2-chlorofuran, up to 100° C. Above 100° C. polymerization of furan becomes excessive. We prefer to maintain the reaction temperature below the boiling point of 2-chlorofuran (77° C.) but above the boiling point of furan (32° C.); e. g., at around 50° C.

The amount of chlorine fed into this furan vapor must be relatively small and should not exceed the ratio of 0.1 volume of chlorine to one volume of furan. This ratio may be as low as 0.01 to 1 or even lower, if desired.

We claim:

1. The process for the production of 2-chlorofuran which comprises introducing chlorine into a flowing stream of furan vapor maintained at a temperature between the boiling points of furan and 2-chlorofuran in the ratio of not more than about 0.1 volume of chlorine to one volume of furan, separating condensed 2-chlorofuran from said vapor and separating hydrogen chloride from the remaining vapor by condensing the furan.

2. The process for the production of 2-chloroufran which comprises introducing chlorine into a flowing stream of furan vapor at a temperature not higher than about 100° C. in the ratio of not more than about 0.1 volume of chlorine to one volume of furan, condensing 2-chlorofuran from said vapor, and separating hydrogen chloride from the remaining furan vapor by condensing said furan vapor.

3. The process for the production of 2-chlorofuran which comprises introducing chlorine into a flowing stream of furan vapor at a temperature not higher than about 100° C. in the ratio of not more than about 0.1 volume of chlorine to one volume of furan vapor and separating hydrogen chloride from said vapor by condensing 2-chlorofuran and furan therefrom.

4. The process for the production of 2-chlorofuran which comprises continuously flowing a stream of furan vapor through a space wherein said vapor is maintained at a temperature between the boiling points of furan and 2-chlorofuran, introducing chlorine into said stream of furan vapor in the ratio of about 0.01 to 0.1 volume of chlorine to one volume of furan vapor, removing condensed 2-chlorofuran from said space and separating hydrogen chloride from the vapors flowing from said space by cooling; to condense furan therefrom.

5. The process for the production of 2-chlorofuran which comprises passing furan vapor upwardly through a distilling column maintained at a temperature between the boiling points of furan and 2-chlorofuran, passing chlorine into said column at a ratio of 0.01 to 0.1 volume to one volume of furan vapor, withdrawing condensed 2-chlorofuran from the lower part of said column and furan vapor and hydrogen chloride from the upper part thereof and condensing the effluent furan vapor so as to separate hydrogen chloride therefrom.

6. The process for the production of 2-chlorofuran which comprises introducing chlorine into a flowing stream of furan vapor at a temperature not higher than about 100° C. in the ratio of not more than about 0.1 volume of chlorine to one volume of furan vapor, and separating hydrogen chloride from said vapor by condensing the furan and condensing 2-chlorofuran from said vapor.

OLIVER W. CASS.
HARRY B. COPELIN.

REFERENCES CITED

The following references are of record in the file of this patent:

Chemical Abstracts, vol. 24, p. 3011$^1$, of 1930.
Unit Processes in Organic Synthesis, by Groggins, 1938, 2d ed., pp. 166, 184, 185. (Copy in Div. 63.)